Dec. 11, 1934.  N. B. HANSEN  1,984,212
MILKING STOOL
Filed Feb. 12, 1934
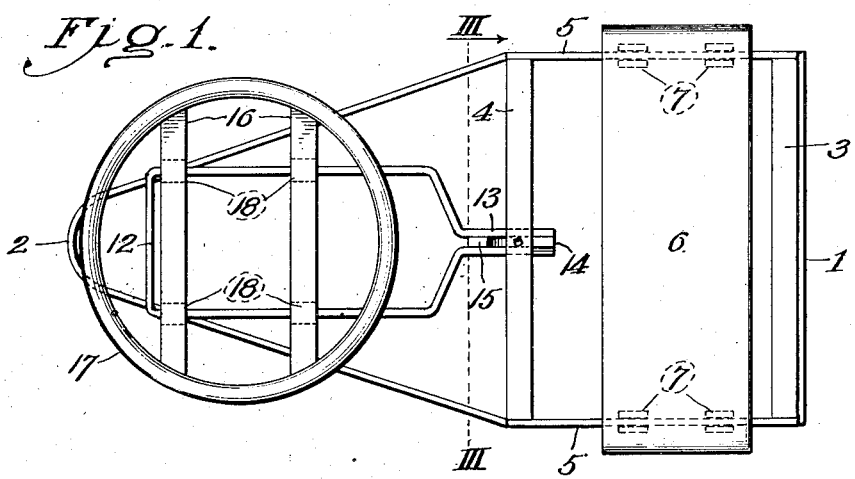
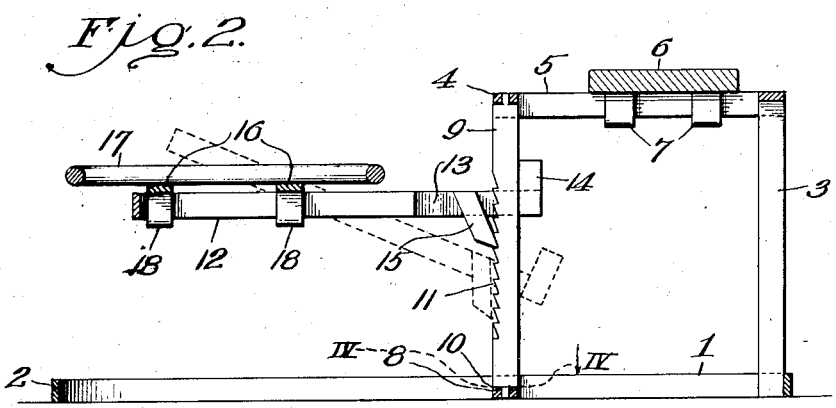
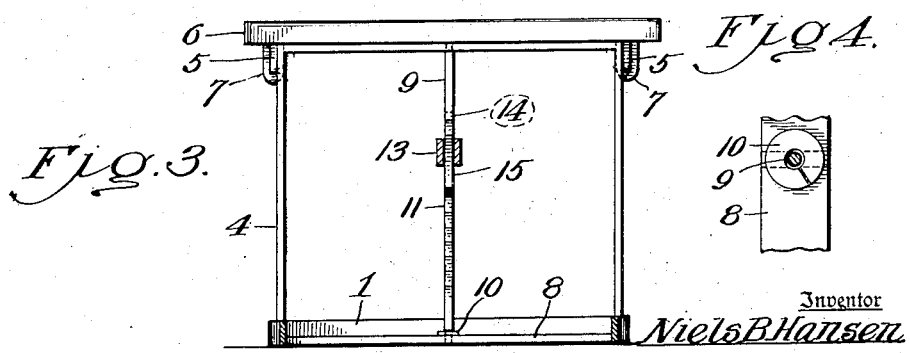
Inventor
Niels B Hansen
By Thorpe & Thorpe
Attorneys Patented Dec. 11, 1934 1,984,212

UNITED STATES PATENT OFFICE 1,984,212

MILKING STOOL

Niels B. Hansen, Willis, Kans.

Application February 12, 1934, Serial No. 710,827

6 Claims. (Cl. 31—57)

This invention relates to milking stools and has for its general object to produce a stool having certain adjustments which have been found to be of most practical importance in hand milking.

One of the objects of the invention is to produce a ground stand which may be positioned in the approximate milking relation, the seat of the operator being adjustable so that he can then position himself most advantageously for the milking operation.

Another object of the invention is to provide a bucket support which is floatingly carried on the ground stand so that it may be adjusted vertically, forwardly and backwardly and longitudinally of the animal to be milked. These adjustments are important both from convenience to the milker as well as making it possible to properly position the bucket to avoid its being kicked over or stepped into by the cow, and to get the bucket up close to the cow without fatigue to the operator and to avoid loss of milk and to minimize possibility of contamination by dust or the like.

A further object of the invention is to produce a milking stool which will not upset or tip should a loaded pail be placed on the bucket support while the milker is not occupying the seat.

With the general objects named in view and others as will hereinafter appear, the invention consists in certain novel and useful features of construction and organization of parts as hereinafter described or the equivalents thereof; and in order that it may be fully understood, reference is to be had to the accompanying drawing, in which:—

Figure 1 is a top plan view of a milking stool embodying the invention.

Figure 2 is a central vertical longitudinal section through the stool.

Figure 3 is a section on the line III—III of Figure 1.

Figure 4 is a section on the line IV—IV of Figure 2.

In the said drawing where like reference characters identify corresponding parts in all of the figures, the device comprises a rear portion 1 of generally U-shape, and a front portion 2 of generally V-shape, although any other configuration as found convenient may be used. The base 1—2 may be bent out of a single strip of material if thought desirable. Mounted upon the rear portion 2 of the base frame by welding or in any other suitable manner, is a stiff skeleton super-structure, shown as composed of a pair of inverted U-frames 3 and 4, connected together at the top by a pair of side bars 5 by spot welding or other conventional practice. A slidable seat 6 for forward and rearward adjustment spans the space between and rests on the side bars 5. To retain the seat 6 reliably in place it is shown as having depending loops or keepers 7 through which the side bars 5 extend.

The base, at the junction of the rear and extension portions 1 and 2, respectively, has a cross-bar 8 vertically below the bridge or cross bar portion of the inverted U-frame 3, and swivelled to the said cross bar 8 and the bridge portion of the frame 3, is a vertical bar 9 which serves as a brace or strut and as the direct support for a vertically-adjustable frame or bucket support, so that the latter may be supported at the desired height and may be swung back and forth longitudinally of the cow.

To prevent too free swivel movement of the bar, resort may be had to a split metal spring washer 10 disposed around the lower pivot extension of the bar and between the bar and the cross-bar 8. The bar 9 as one means of providing for vertical adjustment of the bucket support, hereinafter identified is formed along one of its edges with a series of ratchet teeth 11.

The vertically-adjustable frame to carry the weight of the milk bucket is in the form of a wide loop 12 and a pair of spaced ends 13, the latter snugly receiving the swivelled bar 9. The space between the ends 13 is closed by a stop 14 which engages the rear vertical edge of the bar 9. The ends 13 also carry a downwardly and obliquely extending dog 15 for cooperative engagement with the teeth 11 in the vertical adjustment of the frame.

When the vertically adjustable frame is horizontal, the preponderating weight at its front end, exerts leverage for holding the dog 15 in engagement with a tooth 11 of the bar 9, and the stop 14 against the rear edge of said bar 9. To adjust the support, it must be first tilted as shown by dotted lines, Figure 2, and then may be shifted to a higher or a lower plane. When released, it pivots automatically to a horizontal position, the dog and arm reengaging the bar.

A bucket platform is slidingly mounted on the supporting frame 12 for adjustment toward and from the seat, which adjustment is laterally of a cow to be milked. It preferably consists of a pair of cross plates 16 for a bucket to rest upon, and a ring or flange 17 to encircle the lower end of the bucket as a guard against its sliding off the cross plates. The cross plate 16 rests upon the wide loop portion 12 of the support and have depending keepers 18 receiving sides of said loop, it being noted, in this connection that the possibility of a charged bucket on the extreme front end of the support, overbalancing the seat end of the structure, when the latter is carrying no occupant, is prevented by the forward extension 2 of the base frame.

From the above description it will be apparent that I have produced a milking stool possessing all of the features of advantage set forth as desirable, and I reserve the right to all changes within the spirit of the invention and without the ambit of the prior art.

I claim:—

1. In a milking stool, the combination of a frame, a seat slidable back and forth on the frame, and a pail-support supported upon, projecting forwardly from, and swingable laterally of the frame.

2. A milking stool, comprising a base having a rear cross bar, parallel side portions, a front portion and a cross bar connecting the side portions at the junction thereof with the front portion, a rectangular top frame having its side bars paralleling the side bars of the base, pairs of front and rear uprights rigid with and depending from the corners of the top frame and rigid at their lower ends with the base, a brace between the front pair of uprights and pivoted at its ends to the cross bar of the base and the front cross bar of the top frame, and a seat resting upon the side bars of the top frame and provided with keepers slidably engaging said side bars for back and forth movement of the seat upon the top frame.

3. A milking stool comprising a base for resting upon the ground and a raised rear portion having a skeleton rectangular top frame, a vertical brace below the front end of the top frame and pivoted thereto and to the base for turning movement in a horizontal plane, and provided with a series of forwardly and upwardly facing teeth in its front edge, a vertically-adjustable frame engaging opposite sides of the toothed bar and provided at its rear end with an upstanding stop engaging the rear edge of said brace and also provided near said rear end with a downwardly and rearwardly projecting tooth for engagement with a tooth of the brace below the plane of said stop and a frame slidable upon the vertically-adjustable frame toward or from the seat.

4. A milking stool comprising a frame provided with a seat and a ground-engaging front extension, a frame projecting forwardly from and vertically adjustable on said frame and having parallel spaced side portions and a connecting front portion, and a circular pail receiving frame having a pair of cross bars provided with depending loops slidingly engaging the spaced sides of said frame.

5. A milking stool comprising a frame provided with front upper and lower cross bars and having a seat, a pail carrying frame at the front end of the first named frame, a vertically toothed bar journaled at its upper and lower ends in the upper and lower cross bars of the first named frame and cooperating with the pail carrying frame to hold the same in different vertical positions.

6. A milking stool comprising a frame provided with front upper and lower cross bars and having a seat, a pail carrying the frame at the front end of the first named frame, a bar journaled at its upper and lower ends in the upper and lower cross bars of the first named frame, and cooperating means between the bar and pail carrying frame to hold the latter in different vertical positions.

NIELS B. HANSEN.